United States Patent [19]

Kassai

[11] Patent Number: 4,762,335
[45] Date of Patent: Aug. 9, 1988

[54] BABY CARRIAGE

[75] Inventor: Kenzou Kassai, Osaka, Japan

[73] Assignee: Aprica Kassai Kabushikikaisha, Osaka, Japan

[21] Appl. No.: 31,983

[22] Filed: Mar. 27, 1987

[30] Foreign Application Priority Data

Mar. 28, 1986 [JP] Japan .................................. 61-72099
Jun. 24, 1986 [JP] Japan .................................. 61-149051
Jul. 7, 1986 [JP] Japan .................................. 61-159960

[51] Int. Cl.⁴ ............................................. B62B 11/00
[52] U.S. Cl. ..................................... 280/649; 280/650
[58] Field of Search ............... 280/289 WC, 639, 642, 280/643, 644, 647, 649, 650, 657, 658, 87.02 W, 47.38

[56] References Cited

U.S. PATENT DOCUMENTS 4,111,454  9/1978  Kassai .................................. 280/649
4,386,790  6/1983  Kassai .................................. 280/650
4,616,844 10/1986  Kassai .................................. 280/650
4,645,229  2/1987  Kassai .................................. 280/650

FOREIGN PATENT DOCUMENTS 15100  4/1981  Japan .
128268 10/1981  Japan .
 99765  6/1985  Japan .
131460 10/1986  Japan .

Primary Examiner—John J. Love
Assistant Examiner—Richard Camby
Attorney, Agent, or Firm—W. G. Fasse; D. H. Kane, Jr.

[57] ABSTRACT

A baby carriage has a pair of front legs (3, 4), a pair of rear legs (7, 8) turnably connected to the front legs (3, 4) by pins, a pair of seat support rods (9, 10) turnably connected to the rear legs (7, 8), a pair of seat suspending rods (11, 12) turnably connected to the seat support rods (9, 10), a pair of push rods (13, 14) turnably connected at their lower portions to the upper portions of the front legs (3, 4) and also turnably connected to the seat suspending rods (11, 12) by pins at their intersections. A widthwise connecting member (15, 16, 17) connects the right and left sides surfaces of the baby carriage, members (18, 19, 20) fix the open state of the baby carriage. When the baby carriage is in the folded state, the rear legs (5, 6) and the front legs (1, 2) lie substantially on the same level, enabling the baby carriage to stand by itself.

11 Claims, 20 Drawing Sheets

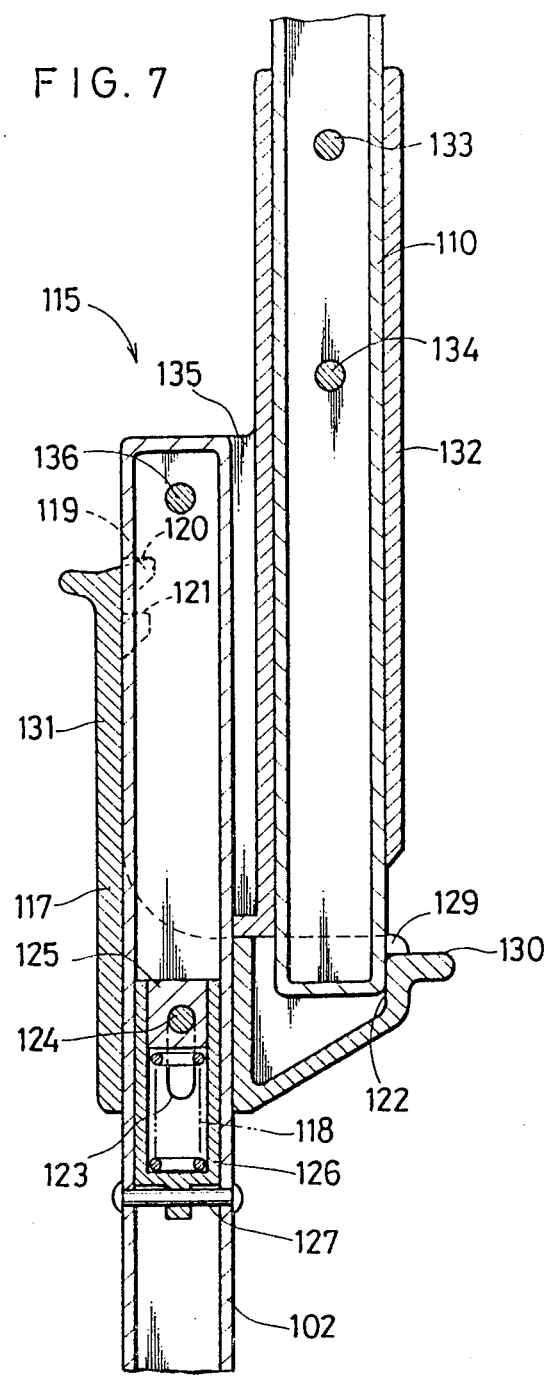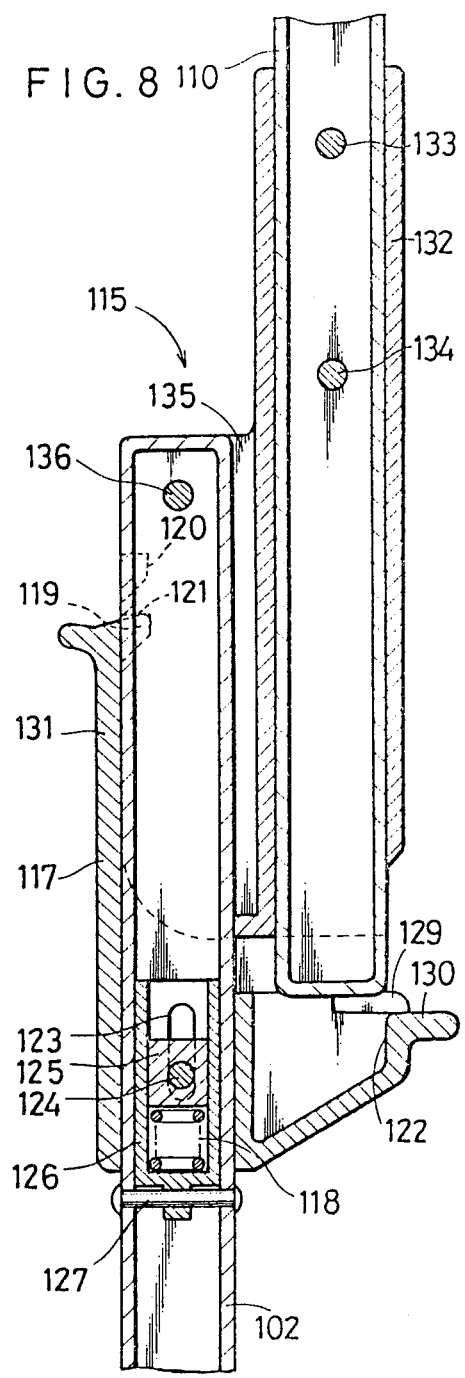

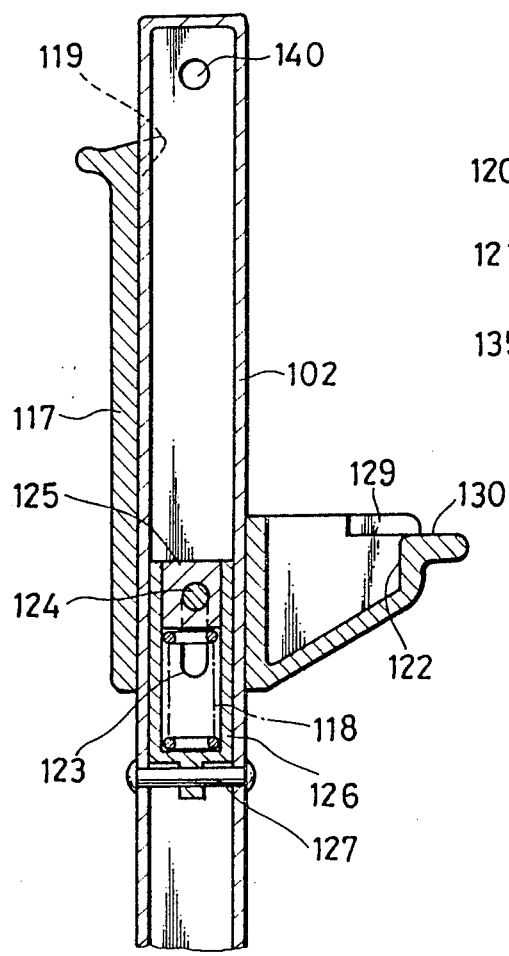
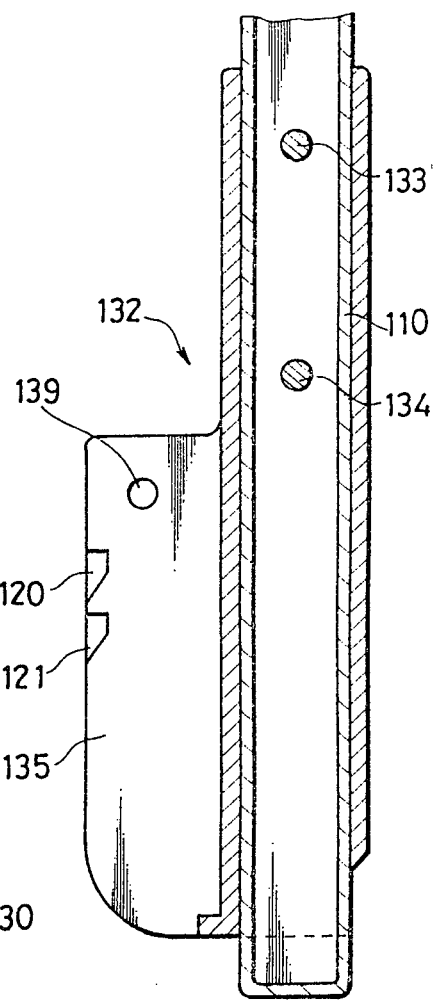

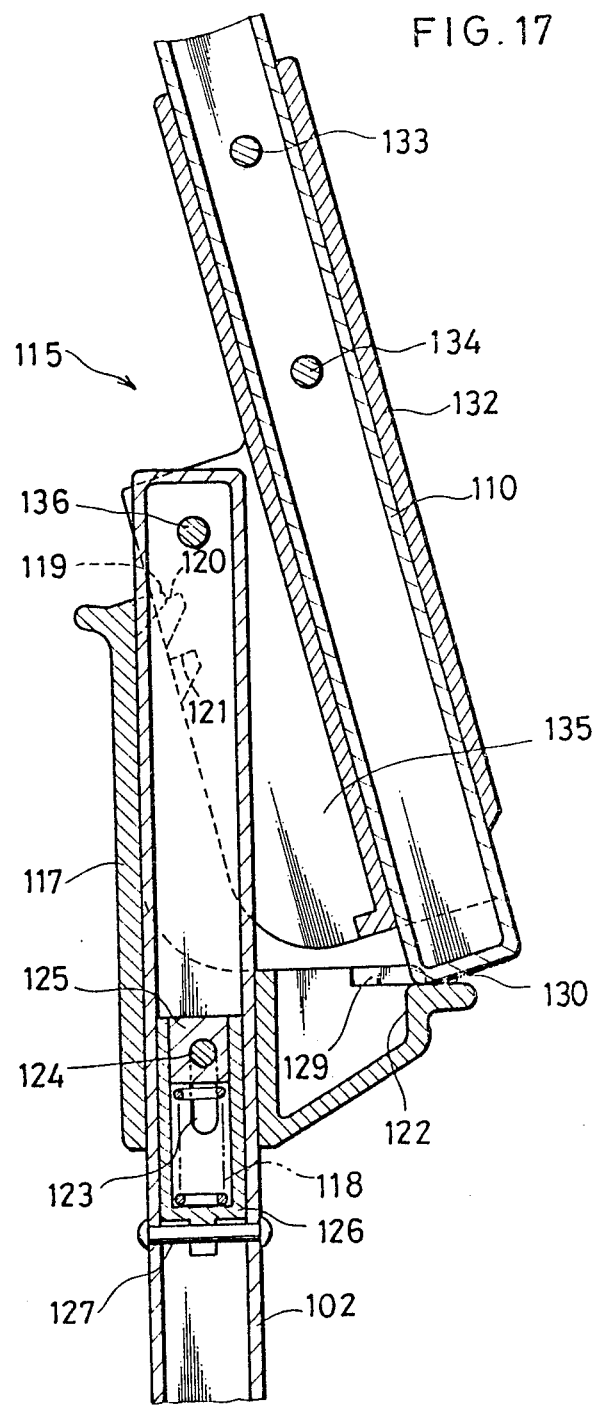

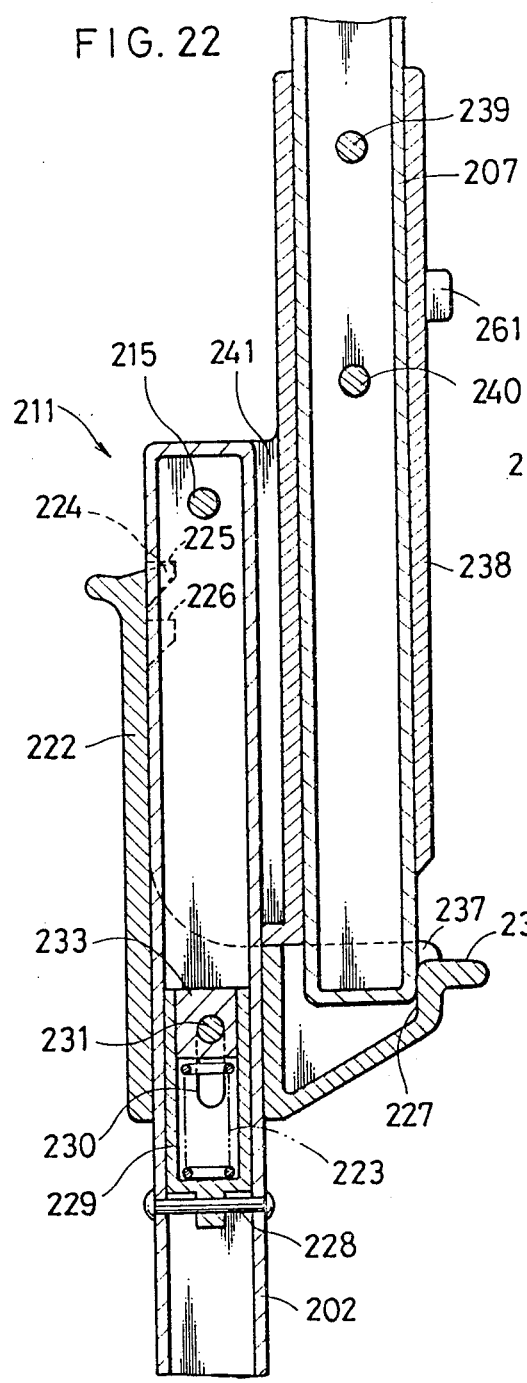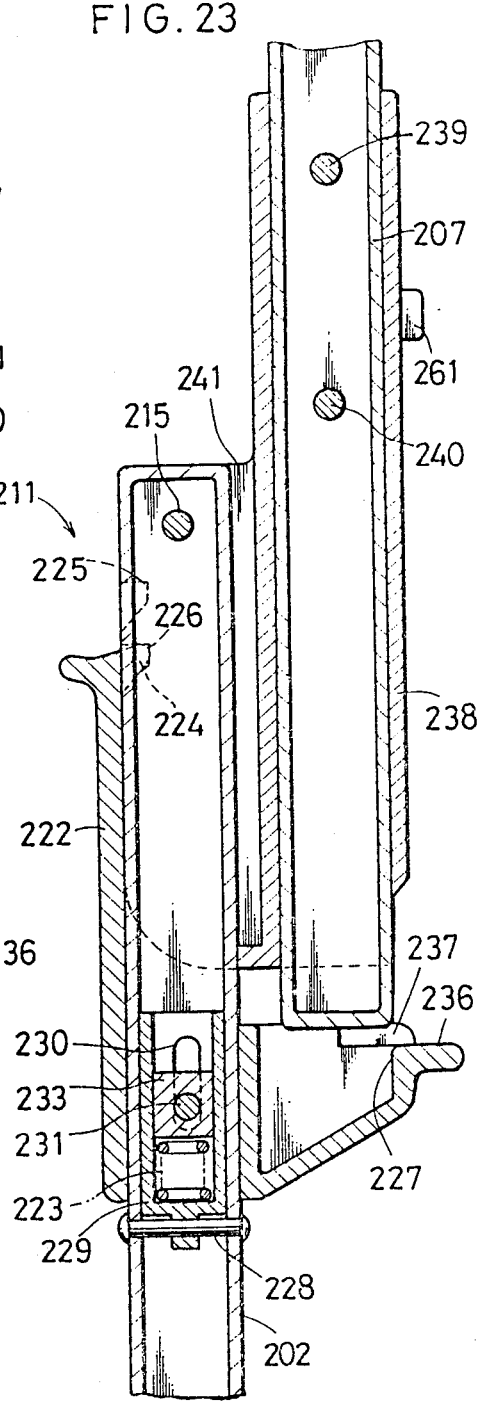

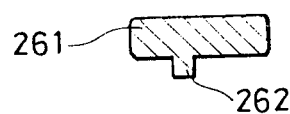
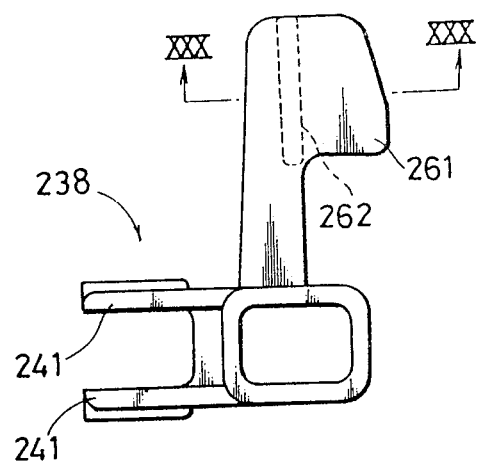
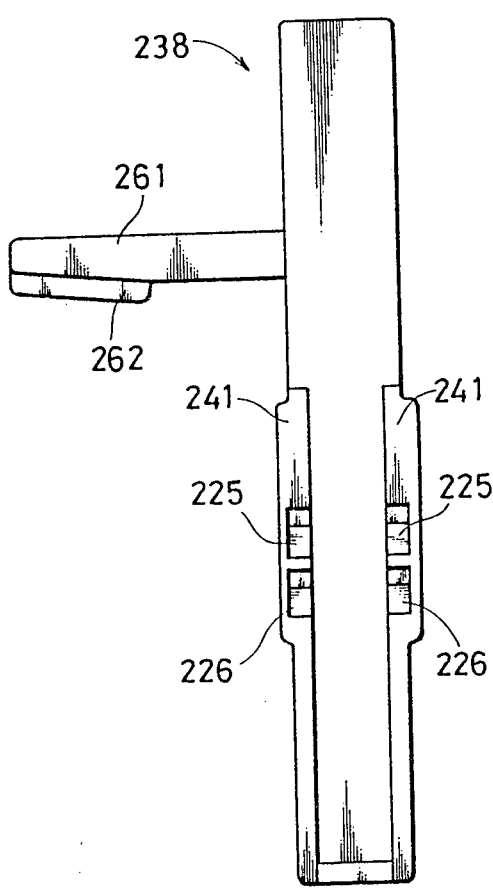
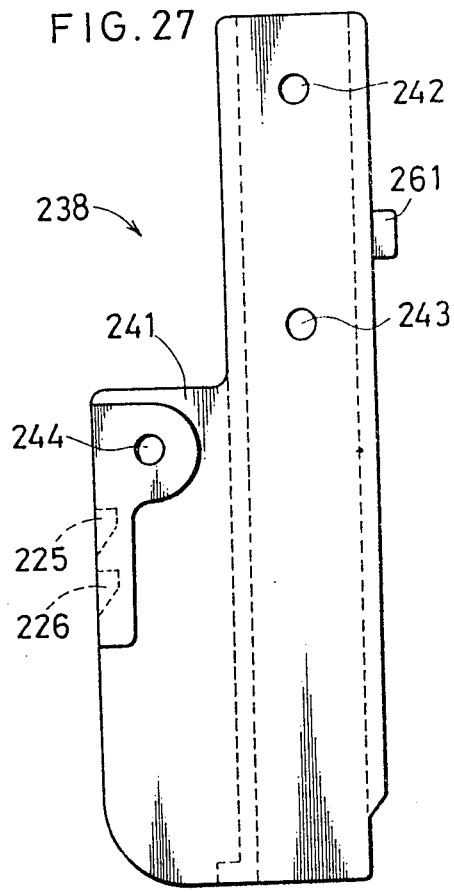

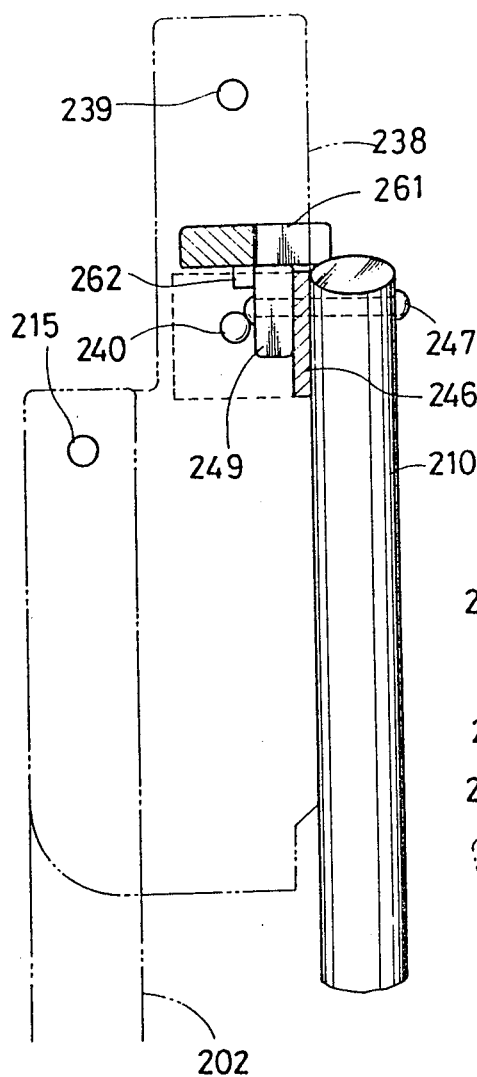
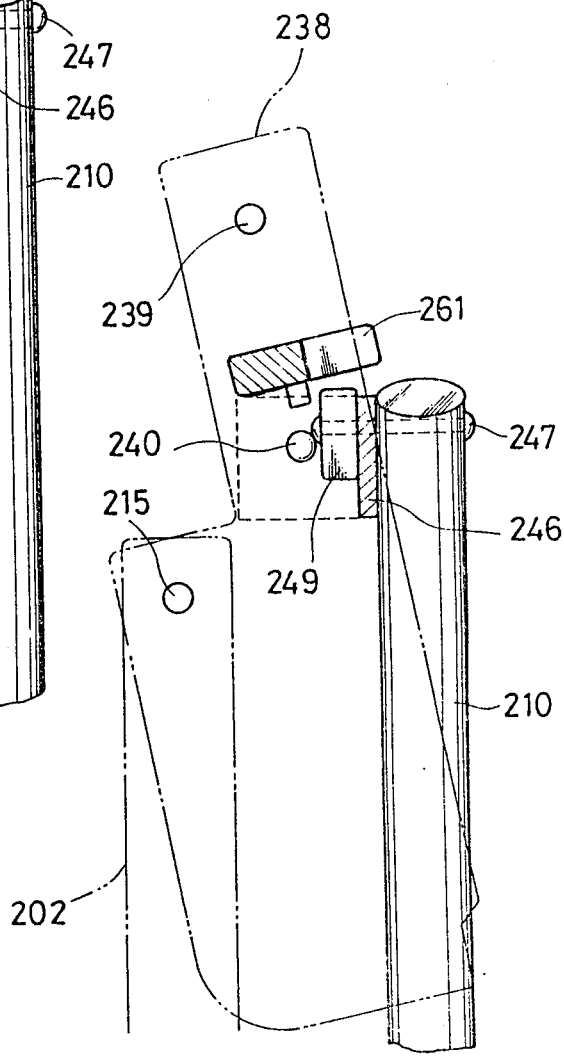

4,762,335

BABY CARRIAGE

BACKGROUND OF THE INVENTION

1. Field of the Invention

This invention relates to a baby carriage, more particularly to a baby carraige having a for simple lightweight construction.

2. Description of the Prior Art

At present, a variety of baby carriages are on the market. Consumers tend to select those features which meet their tastes or demands. What decides their selection varies from person to person but includes the common factor "lightweight." A simple, lightweight construction is an important factor which enhances the market value of baby carriages.

Japanese Utility Model Publication No. 15100/1981 discloses a light weight baby carriage. However, there is still a problem which has yet to be solved. The known baby carriage is foldable and when it is folded, its front and rear wheels are moved away from each other. As a result, in the folded states, the baby carriage is substantially flat along the ground. In other words, the baby carriage cannot stand by itself. Therefore, the baby carriage is inconvenient when it is to be carried around or stored in a suitable place.

SUMMARY OF THE INVENTION

Accordingly, it is an object of the invention to provide a baby carriage which is simple in construction and which can stand by itself when it is in the folded state.

A baby carriage according to the invention comprises the following features a pair of front legs having front wheels on the lower portions thereof, a pair of rear legs having rear wheels on the lower portions thereof and turnably connected to said front legs by pins at the intersections therebetween, a pair of seat support rods turnably connected at their front portions to the upper portions of said rear legs, a pair of seat suspending rods turnably connected at their lower portions thereof to the rear portions of said seat support rods, the suspending rods are connected at their upper ends to pushrods forming part of a pair of push rods turnably connected at their lower portions to the upper portions of said front legs by pins at the intersections therebetween, widthwise connecting means for connecting the right and left lateral surfaces of the baby carriage formed of said front legs, rear legs, support rods, seat suspending rods and push rods, and opened state locking means for fixing the opened state of said baby carriage.

The front legs, rear legs, seat support rods, seat suspending rods, push rods and widthwise connecting means have their lengths and positions suitably selected to function so that when the baby carriage is folded, the rear wheels are moved toward the front wheels and when the baby carriage is in the folded state, the rear and front wheels are positioned on substantially the same level, making it possible for the baby carriage to stand by itself.

According to this invention, the number of members constituting the skeleton of the baby carriage is small and the construction is simple. Further, since the baby carriage can stand by itself in the folded state, it can be conveniently carried around or stored in a suitable place.

When it is desired to fold the baby carriage, first the operator cancels the locking provided by the open state locking means. Then the operator turns the push rods forward, whereupon the rear wheels are moved toward the front wheels. When the baby carriage is in the folded state, the rear and front wheels are positioned on substantially the same level, making it possible for the baby carriage to stand by itself.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a side view, in section, showing the main portion of the second embodiment of the invention;

FIG. 8 is a view showing the state established by moving a slide member downward from the state shown in FIG. 7;

FIG. 15 is a side view, in section, of a connecting portion between the slide member and the front leg;

FIG. 16 is a side view, in section, of a connecting portion between the push rod sleeve and the push rod;

FIG. 17 shows the state in which the lower end of the guide wall of the push rod abuts against the slide member;

FIG. 22 is a sectional view showing the construction of a connecting portion between a front leg and a push rod;

FIG. 23 is a view showing the state established by moving a slide member downward from the state shown in FIG. 22;

FIG. 27 is a side view of a push rod sleeve shown in FIGS. 22 and 23;

FIG. 28 is a front view of the push rod sleeve;

FIG. 29 is a plan view of the push rod sleeve;

FIG. 30 is a sectional view taken along the line XXX—XXX in FIG. 29;

FIG. 37 is a view taken along the line XXXVII—XXXVII in FIG. 34; and

FIG. 38 is a view showing the state in which a push rod sleeve is slightly turned forward from the state shown in FIG. 37.

DESCRIPTION OF THE PREFERRED EMBODIMENTS

Figure 1:
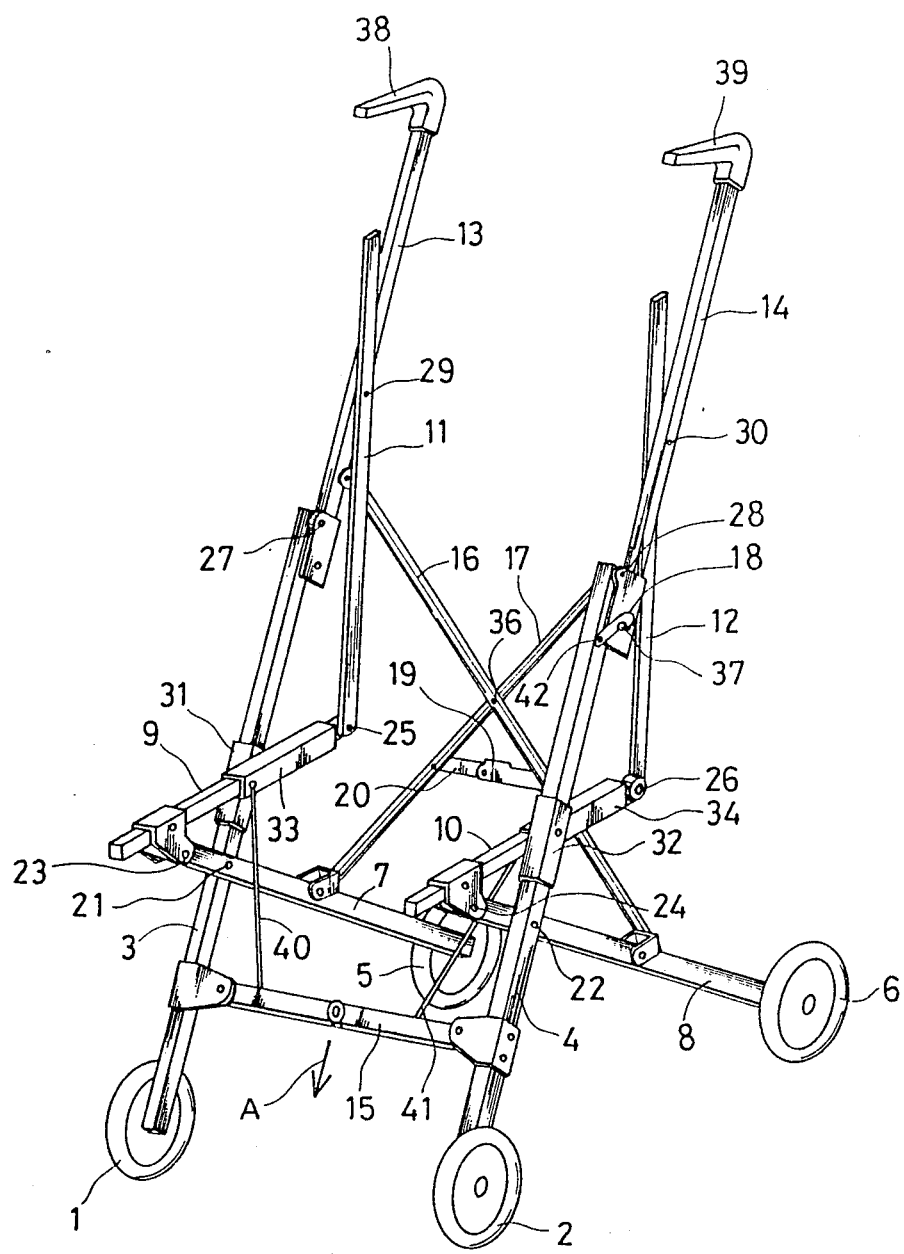
FIG. 1 is a perspective view showing a first embodiment of the invention.
Figure 2:
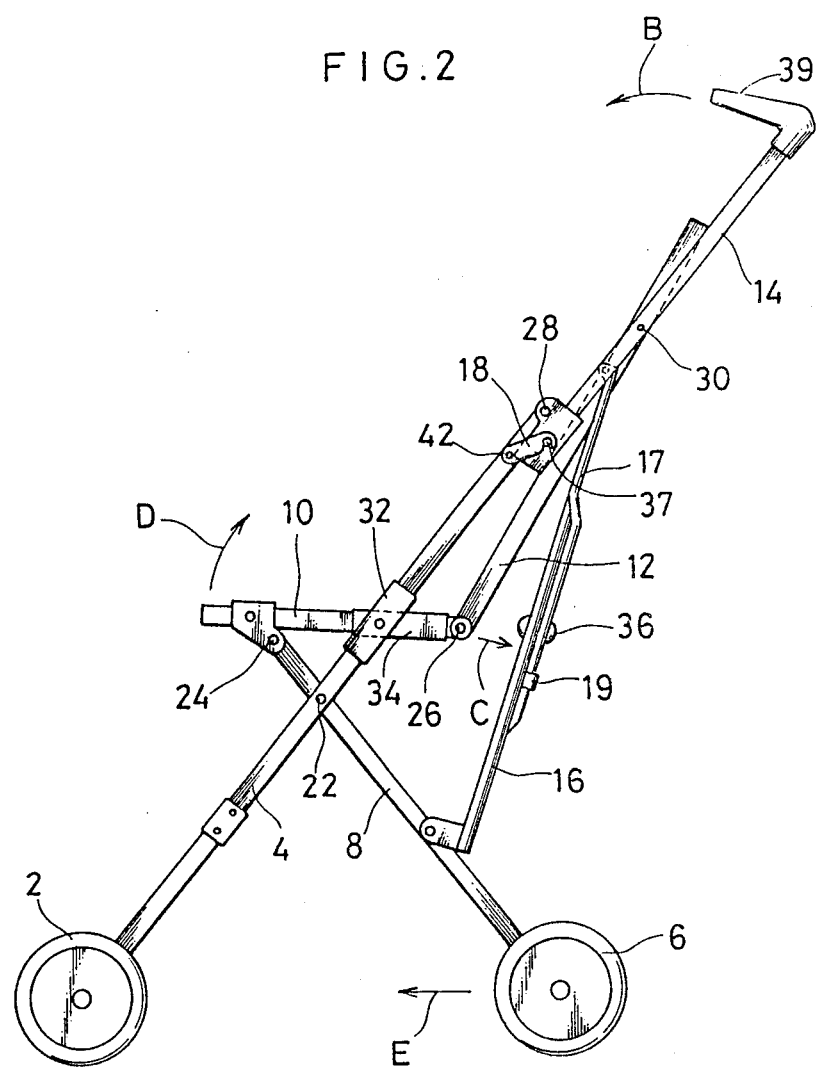
FIG. 2 is a side view of the baby carriage shown in FIG. 1.

FIG. 1 is a perspective view of a first embodiment of the invention, and FIG. 2 is a side view thereof.

The illustrated baby carriage comprises a pair of front legs 3 and 4 respectively having front wheels 1 and 2 at their lower ends, a pair of rear legs 7 and 8 respectively having rear wheels 5 and 6 at their lower ends, a pair of seat support rods 9 and 10, and a pair of seat suspending rods 11 and 12, a pair of push rods 13 and 14, a front leg connecting member 15 serving as widthwise connecting means for connecting opposite lateral surfaces of the baby carriage, a pair of cross rods 16 and 17 acting as transverse connecting means, a hook 18 acting as open state locking means for fixing the opened state of the baby carriage, and a pair of link rods 19 and 20 acting as open state locking means.

The front legs 3, 4 and the rear legs 7, 8 cross each other and are turnably connected together by pins 21 and 22, respectively, at the intersections. The front portions of the seat support rods 9 and 10 are turnably connected to the upper portions of the rear legs 7 and 8 by pins 23 and 24. The seat suspending rods 11 and 12 are turnably connected at their lower portions to the rear portions of the seat support rods 9 and 10 by pins 25 and 26.

The lower portions of the push rods 13 and 14 are turnably connected to the upper portions of the front legs 3 and 4 by pins 27 and 28. As shown, the push rods 13, 14 and the seat suspending rods 11, 12 cross each other and are turnably connected together by pins 29 and 30 at the intersections. The upper ends of the push rods 13 and 14 are formed with handles 38 and 39 to be gripped by a person who pushes the baby carriage.

The front leg connecting member 15 is turnably connected at its opposite ends respectively to the front legs 3 and 4 and is foldable at its middle in the direction of arrow A. The pair of cross rods 16 and 17 cross each other and are turnably connected together at the intersection. One cross rod 16 is turnably connected at its upper end to the push rod 13 positioned on the right-hand side of the carriage and at its lower end to the rear leg 8 positioned on the left-hand side of the carriage. The other cross rod 17 is turnably connected at its upper end to the push rod 14 positioned on the left-hand side of the carriage and at its lower end to the rear leg 7 positioned on the right-hand side of the carriage.

Figure 3:
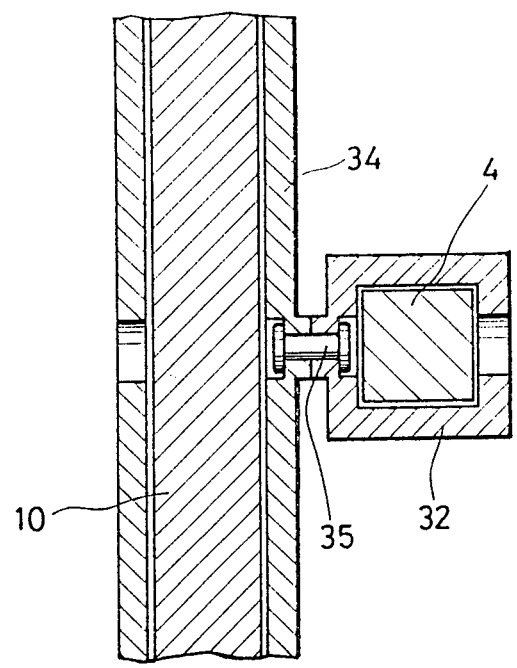
FIG. 3 is an enlarged sectional view showing a connecting portion between a front leg sleeve and a seat sleeve.

The front legs 3 and 4 have front leg sleeves 31 and 32 adapted to slide thereon, respectively. The seat support rods 9 and 10 have seat sleeves 33 and 34 adapted to slide thereon, respectively. The front leg sleeves 31 and 32 are turnably connected to the seat sleeves 33 and 34. FIG. 3 is an enlarged sectional view of the connecting portion between the front leg sleeve 32 and the seat sleeve 34. Referring to FIG. 3, the front leg sleeve 32 slidably receives the front leg 4, while the seat sleeve 34 slidably receives the seat support rod 10. The front leg sleeve 32 and the seat sleeve 34 are turnably connected together by a pin 35. The front leg sleeve 31 and seat sleeve 33 positioned on the right-hand side surface are turnably connected together in the same manner as in FIG. 3.

Referring to FIG. 1, to establish operative association between the slide movement of the seat sleeves 33, 34 and the folding movement of the front leg connecting member 15, prop rods 40 and 41 are provided between the seat sleeves 33, 34 and the front leg connecting member 15.

FIGS. 1 and 2 show the opened state of the baby carriage. For locking the carriage in the open state, there are provided a hook 18 and a pair of link rods 19 and 20. The hook 18 is turnably attached to the front leg 4 by a pin 42. The hook 18 is adapted to engage an engaging pin 37 provided on the lower end of the push rod 14 to thereby inhibit the push rod 14 relative to the front leg 4. A similar hook is provided between the front leg 3 and push rod 13 positioned on the right-hand side surface of the baby carriage. Link rods 19 and 20 forming a pair, as shown in FIG. 1, secure the cross angle between the pair of cross rods 16 and 17 and thereby fix the positions of the push rods 13 and 14 relative to the rear legs 7 and 8.

A seat for supporting a child to be placed on the baby carriage will have its seat portion attached by utilizing the seat support rods 9 and 10 and have its backrest portion attached by utilizing the seat suspending rods 11 and 12. The backrest portion of the seat may be attached by utilizing the push rods 13 and 14.

The front legs 3, 4 and seat support rods 9, 10 are connected together by the front leg sleeves 31, 32 and seat sleeves 33 and 34. However, since the seat suspending rods support the rear portions of the seat support rods 9 and 10, it is not absolutely necessary to connect the front legs 3, 4 and seat support rods 9, 10 together. However, if they are connected together by the front leg sleeves 31, 32 and seat sleeves 33, 34, as shown, firmer connection can be made. Further, since the front leg sleeves 31 and 32 slidably receive the front legs 3 and 4 and the seat sleeves 33 and 34 slidably receives the seat support rods 9 and 10, there is no danger that the connection between the front legs 3, 4 and the seat support rods 9, 10 can infefere with the folding movment of the baby carriage to be described below. If the end of the backward slide movement of the seat sleeves 33 and 34 is defined when the baby carriage is in the open state, the open stat of the baby carriage can be made firmer.

When it is desired to fold the baby carriage, first the hooks 18 are turned to cancel the locked state between the front legs 3, 4 and the push rods 13, 14. Then, the pair of link rods 19 and 20 is slightly moved upwardly, thereby canceling the locked state between the pair of cross rods 16 and 17. In this state, the push rods 13 and 14 are pushed forward, whereupon they are turned around the axes of the pins 27 and 28 in the direction of arrow B as shown in FIG. 2. With this turning movement of the push rods 13 and 14, the pins 25 and 26 (at the intersections between the seat support rods 9, 10 and the seat suspending rods 11, 12) are moved backwardly, as indicated by the arrow C in FIG. 2. At this time, the seat support rods 9 and 10 are caused to slide in the seat sleeves 33 and 34. Further, the seat support rods 9 and 10, as indicated by the arrow D in FIG. 2, are turned around the intersections between the seat sleeves 33, 34 and the front leg sleeves 31, 32. As a result, the rear wheels 5 and 6 are moved toward the front wheels 1 and 2.

In addition, during the above operation, the front leg sleeves 31 and 32 slightly slide on the front legs 3 and 4. Referring to FIG. 1, as the above folding operation proceeds, the prop rods 40 and 41 act to fold the front leg connecting member 15, so that the right and left side surfaces move toward each other to reduce the widthwise spacing.

Figure 4:
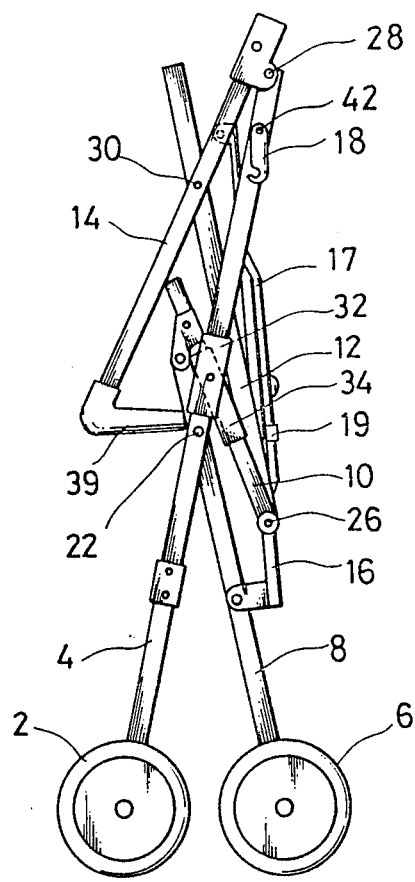
FIG. 4 is a side view showing the folded state of a baby carriage shown in FIG. 1.

FIG. 4 shows the folded state of the baby carriage shown in FIGS. 1 and 2. As shown, the front and rear wheels 1, 2 and 5, 6 are substantially on the same level, enabling the baby carriage to stand by itself. In other words, the fornt legs 3, 4, rear legs 7, 8, seat support rods 9, 10, seat suspending rods 11, 12, push rods 13, 14, and widthwise connecting means have their lengths and positions selected so that said operation can be attained, that is, so that when the baby carriage is being folded, the rear wheels 5 and 6 are moved toward the front wheels 1 and 2 and when the baby carriage is in the folded state, the rear wheels 5 and 6 are substantially on the same level.

In the embodiment described above, the construction of the baby carriage is such that the widthwise spacing is narrowed as the folding of the baby carriage proceeds; however, the baby carriage may be constructed so that its widthwise spacing will not be narrowed. In that case, the pair of cross rods 16 and 17 are not absolutely necessary and instead a pair of vertically extending parallel rods may be used to connect the rear legs 7 and 8 to the push rods 13 and 14. In the embodiment described above, the front leg connecting member 15 and the pair of cross rods 16 and 17 are used as widthwise connecting means. However, a member adapted to connected the right and left push rods 13 and 14 may be provided.

Further, in the embodiment described above, the hooks 18 and the pair of link rods 19 and 20 are used as opened state locking means for fixing the opened state of the baby carriage. However, they are shown only by way of example, and they may be installed at a different place in a different manner.

Figure 5:
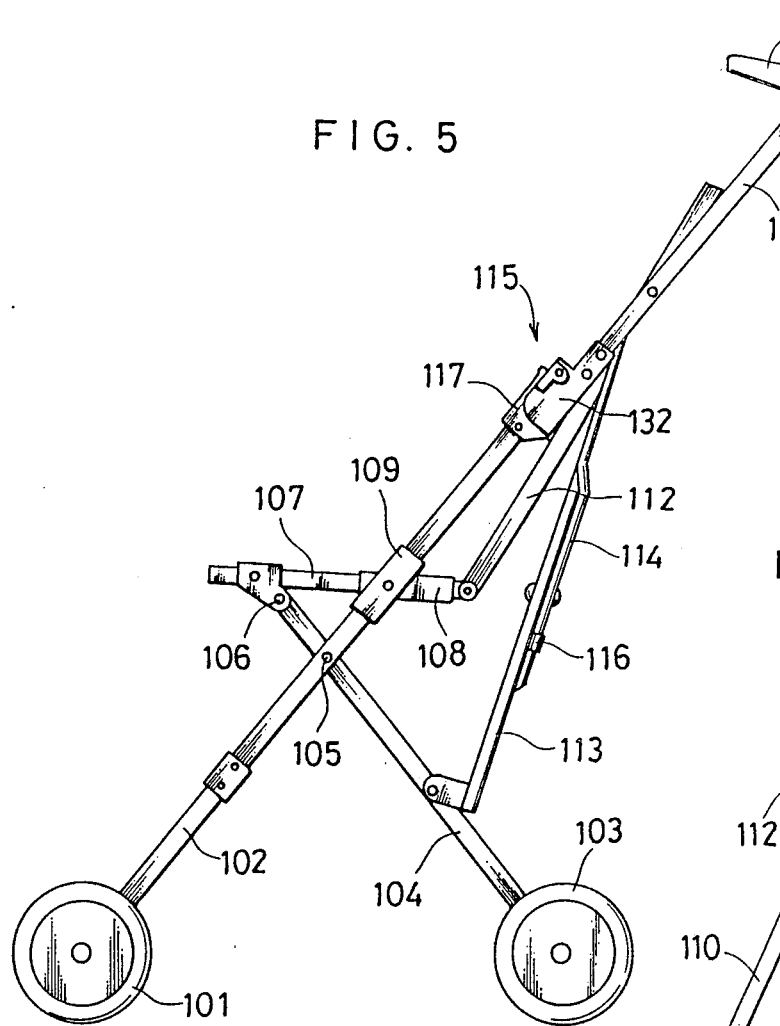
FIG. 5 is a side view of a second embodiment of the invention.
Figure 6:
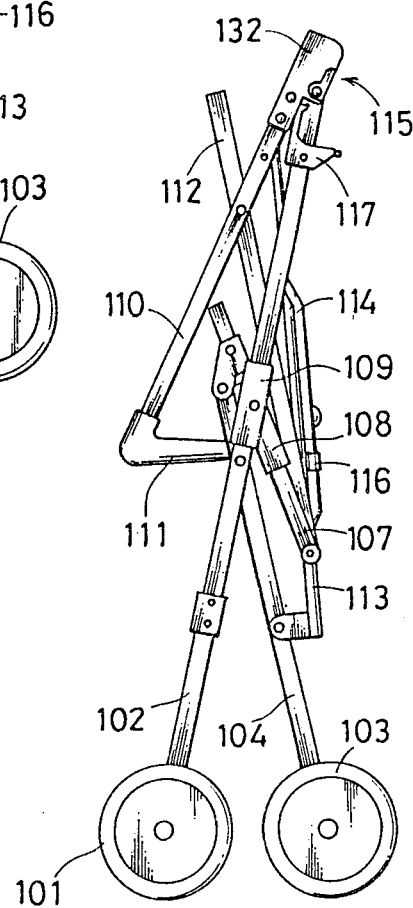
FIG. 6 is a side view showing the folded state of a baby carriage shown in FIG. 5.

FIGS. 5 and 6 shows a second embodiment of the invention.

A front leg 102 having a front wheel 101 and a rear leg 104 having a rear wheel 103 are turnably connected together by a shaft 105. A seat support rod 107 for supporting a seat is turnably connected to the upper end of the rear leg 104. The seat support rod 107 and the front leg 102 are turnably connected together by a seat sleeve 108 and a front leg sleeve 109. The seat sleeve 108 slidably receives the seat support rod 107, while the front leg sleeve 109 slidably receives the front leg 102.

The upper end of the front leg 102 is turnably connected to the lower end of a push rod 110 having a handle 111. The connecting portion between the front leg 102 and the push rod 110 is provided with a locking mechanism 115 for inhibiting the turning of the push rod 110.

The connecting portion of the seat support rod 107 has a seat suspending rod 112 turnably connected thereto, the upper end of said seat suspending rod 112 being turnably connected to the push rod 110. A pair of cross rods 113 and 114 extending in X form are turnably connected at their upper ends to the push rods 110 and at their lower ends to the rear legs 104. The cross angle between the pair of cross rods 113 and 114 is fixed by cross angle fixing means 116.

In the state shown in FIG. 5, the locking mechanism 115 inhibits the turning of the push rod 110, and the cross angle fixing means 116 fixes the cross angle between the cross rods 113 and 114, thereby maintaining the baby carriage in the open unfolded state. When it is desired to fold the baby carriage as shown in FIG. 6, the locking of the cross angle by the cross angle locking means 116 is canceled and then the locked state established by the locking mechanism 115 is also canceled. And the push rods 110 are turned forward in FIG. 5, whereby the state shown in FIG. 6 is obtained.

When the baby carriage is in the opened state, the locking mechanism 115 inhibits the push rod 110 from turning relative to the front leg 102, with the upper end of the front leg 102 lying substantially parallel with the lower end of the push rod 110.

FIGS. 7 and 8 show a side view, in section, of the principal portion of the second embodiment. The illustrated locking mechanism 115 for the push rod comprises a slide member 117, a spring 118, an engaging convex portion 119 and engaging concave portions 120 and 121 adapted to mate with each other, and an engaging wall member 122.

Figure 10:
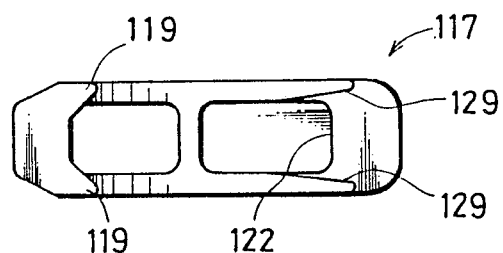
FIG. 10 is a plan view of the slide member.
Figures 9, 11:
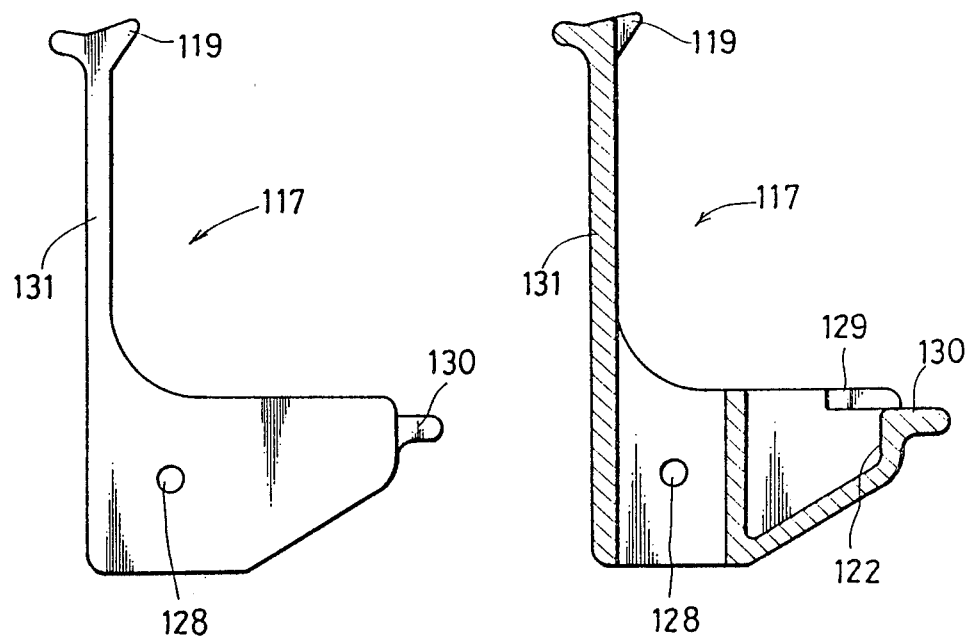
FIG. 9 is a side view of the slide member shown in FIGS. 7 and 8.
FIG. 11 is a side view, in section, of the slide member.

FIGS. 9 to 11 show the slide member 117 singly, and FIG. 15 shows a side view, in section, of the connecting portion between the slide member 117 and the front leg 102. Referring to these figures, the slide member 117 is slidably along the upper end portion of the front leg 102 lengthwise thereof between a first position lying relatively high and a second position lying relatively low. This will now be described in more detail. A spring case 126 is secured inside the upper portion of the front leg 102 by a pin 127. The spring case 126 and the front leg 102 are formed with a vertically elongated opening 123. A pin 124 extends through said elongated opening 123, and the slide member 117 is fixedly attached to said pin 114. A through-hole 128 shown in FIGS. 9 and 11 is adapted to receive the pin 124. Thus, the slide member 117 is allowed to vertically slide by substantially the same amount as the pin 124 is movable in the elongated opening 123.

As shown in FIG. 15, inside the front leg 102, the pin 124 has a spring support member 125 fixedly attached thereto. The spring support member 125 is housed in the spring case 126. A spring 118 is disposed between the bottom wall of the spring case 126 and the spring support member 125. The spring 118 constantly urges the spring support member upward. In other words, the spring 118 urges the slide member 117 to return to the first position lying relatively high.

Referring to FIGS. 9 to 11, the slide member 117 has a columnar portion 131 extending along the front leg 102 extending through said slide member 117, the upper end of said columnar portion 131 being formed with engaging convex portions 119. As best seen in FIG. 7, the slide member 117 has the engaging wall 122 engageable with the lower end of the push rod 110. A guide wall 130 is also formed so that it is continuous with said engaging wall member 122. As shown in FIG. 10, the opposed wall which is adapted to receive the lower end of the push rod 110 has a pair of inclined surfaces 129 with a gradually narrowing spacing therebetween. The functions of the engaging wall member 122, guide wall 130 and inclined surfaces 129 will be described in more detail below.

Figure 14:
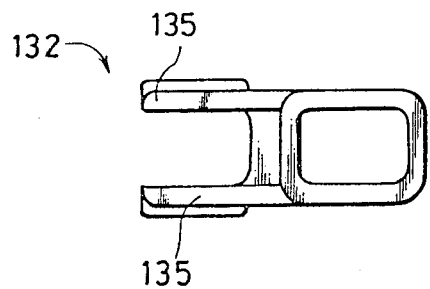
FIG. 14 is a plan view of the push rod sleeve.
Figure 13:
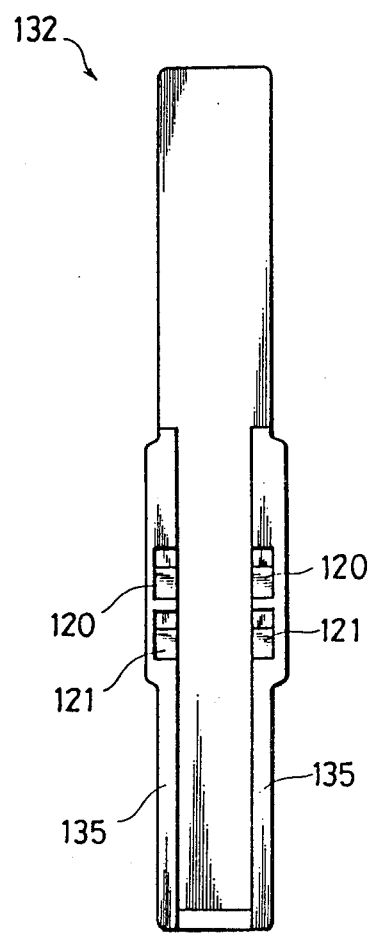
FIG. 13 is a front view of the push rod sleeve.
Figure 12:
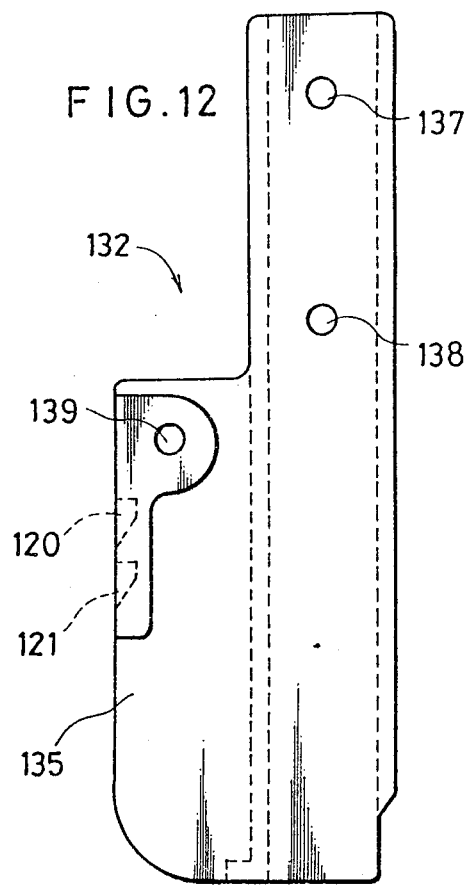
FIG. 12 is a side view of a push rod sleeve shown in FIGS. 7 and 8.

Referring to FIGS. 7 and 8, a push rod sleeves 132 surrounding the push rod 110 is secured to the push rod 110 by pins 133 and 134. The push rod sleeve 132 is shown in FIGS. 12 to 14. A side view partly, in section, showing the connecting portion between the push rod sleeve 132 and the push rod 110 is shown in FIG. 16. Referring to these figures, the push rod sleeve 132 has a pair of projecting walls 135, which are turnably connected to the upper end of the push rod 110 by a connecting shaft 136 shown in FIGS. 7 and 8. That is, the push rod 110 is turnable around the axis of the connecting pin 136. Through-holes 137 and 138 shown in FIG. 12 are used to receive the pins 133 and 134. The connecting shaft 136 extends through a through-hole 139 shown in FIG. 12 and a through-hole 140 shown in FIG. 15.

When the baby carriage is in the open state, the front end surfaces of the projection walls 135 of the push rod sleeve 132 are in opposed relationship to the columnar portion 131 of the slide member 117. The front end surfaces of the projecting walls 135 have engaging concave portions 120 and 121 engageable with the engaging convex portions 119 of the slide member 117.

When the slide member 117 is in the first position lying relatively high, as shown in FIG. 7, the engaging convex portions 119 of the slide member 117 engage the engaging concave portions 120 taking up a high position. On the other hand, when the slide member 117 is in the second relatively low position, as shown in FIG. 8, the engaging convex portions 119 engage the engaging concave portions 121 in their low psition.

The operation of the locking mechanism 115 will now be described with reference to FIGS. 7 and 8.

When the baby carriage is in the open state, the upper end of the front leg 102 is located substantially parallel to the lower end of the push rod 110. When the slide member 117 is in the first position shown in FIG. 7, the engaging wall 122 engages the lower end of the push rod 110, thereby inhibiting the turning of said push rod 110. This locked state is firmly maintained by the action of the spring 118. Further, the fitting between the engaging convex portions 119 and the engaging concave portions 120 also effectively acts to firmly maintain the locked state established by the engaging wall member 122.

When it is desired to fold the baby carriage, the slide member 117 is caused to slid to the second position shown in FIG. 8. In response to the movement of the slide member 117, the columnar portion 131 flexes outwardly once and then the engaging convex portions 119 engage the engaging concave portions 121. While the spring 118 is acting to move the slide member 117 upwardly, the fitting between the engaging convex and concave portions 119 and 121 prevents such movement. When the slide member 117 is in the second position, the engagement between the engaging walal member 122 and the lower end of the push rod 110 is canceled. Therefore, if the push rod 110 is pushed forward, the push rod sleeve 132 together with the push rod 110 is turned counterclockwise in FIG. 8. As a result, the fitting between the engaging convex portions 119 of the slide member 117 and the engaging concave portions 121 of the push rod sleeve 132 is canceled, so that the slide member 117 is returned ot the first position shown in FIG. 7 by the action of the spring 118.

The operation of changing the baby carriage from the folded to the open state will now be described. When the push rod 110 is turned to realize the open state of the baby carriage, first the lower end of the push rod 110 abuts against the guide wall 130 of the slide member 117. When the push rod 110 is further turned clockwise from this state, the guide wall 130 is pushed downwardly by the lower end of the push rod 110, whereby the slide member 117 slides downwardly. When the lower end of the push rod 110 lies substantially in parallel to the upper end of the front leg 102, the slide member 117 is caused to slide upwardly by the action of the spring 118, until the state shown in FIG. 7 is obtained. Thus, the presence of the guide wall 130 makes it unnecessary to perform a special operation to set the locking mechanism 115 in the locking state. However, it is possible to omit the guide wall 130. In that case, immediately before the upper end of the front leg 102 lies substantially in parallel to the lower end of the push rod 110, the slide member 117 must be manually operated for a downward slide movement.

In addition, inclined surfaces 129 on the slide member 117 serve to smoothly guide the push rod 110 when the latter is turned clockwise in FIG. 17.

While the illustrated embodiment has the shown locking mechanism positioned on the left-side surface of the baby carriage, it is to be noted that the same locking mechanism is also provided on the right-hand side surface.

Figure 18:
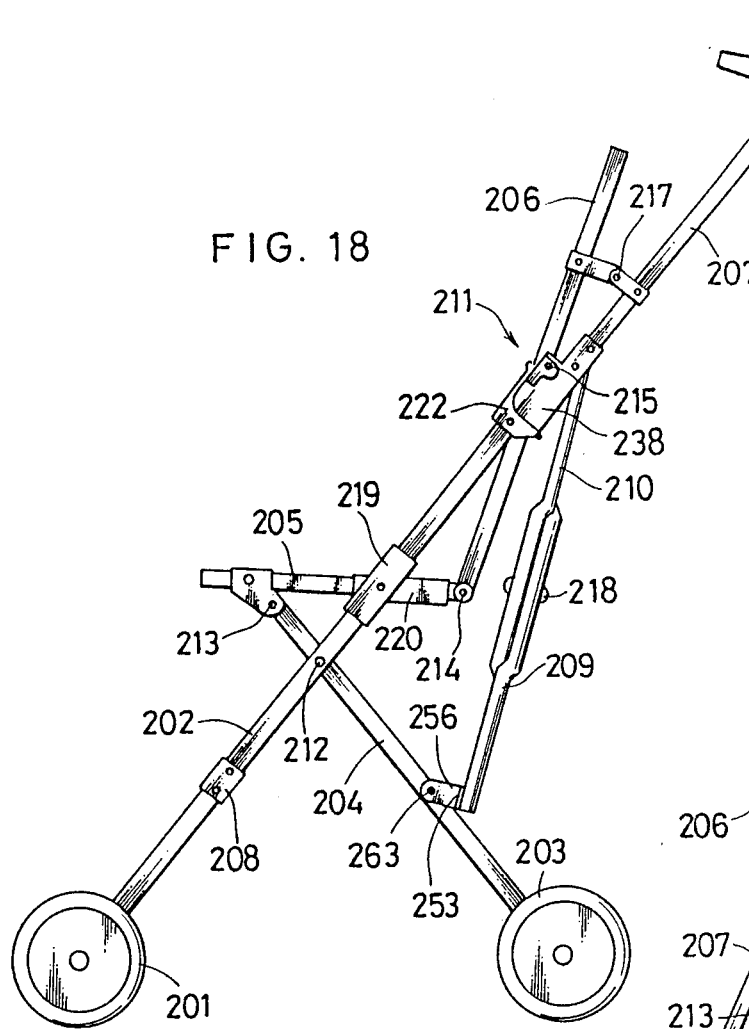
FIG. 18 is a side view showing a third embodiment of the invention.
Figure 19:
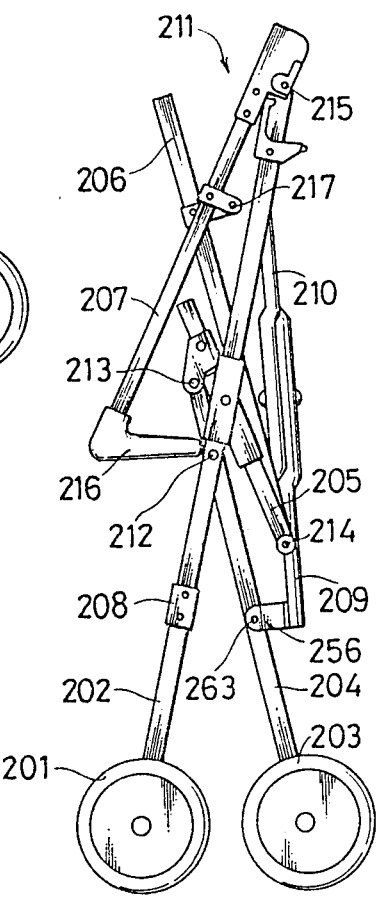
FIG. 19 is a side view showing the folded state of a baby carriage shown in FIG. 18.

FIGS. 18 and 19 show a third embodiment of the invention. FIG. 18 shows the open state of the baby carriage and FIG. 19 shows the folded state of the baby carriage. Both figures shown the left-hand side of the baby carriage; the construction of the right hand side is symmetrical with respect to the illustrated construction.

The illustrated baby carriage comprises a pair of front legs 202 respectively having front wheels 201 at their lower ends, a pair of rear legs 204 respectively having rear wheels 203 at their lower ends, a pair of seat support rods 205, a pair of seat suspending rods 206, a pair of push rods 207, a front leg connecting member 208 serving as means for connecting opposite sides of the baby carriage to each other across the width from side to side of the carriage, a pair of cross rods 209 and 210 acting as transverse connecting means, and open state locking means 211 for fixing the open state of the baby carriage.

The front and rear legs 202 and 204 cross each other and are turnably connected together by a pin 212 at the intersection. The front portion of the seat support rod 205 is turnably connected to the upper portion of the rear leg 204 by a pin 213. The seat suspending rod 206 is turnably connected at its lower portion to the rear portion of the seat support rod 205 by a pin 214.

The lower portion of the push rod 207 is turnably connected to the upper portion of the front leg 202 by a connecting shaft 215. In the open state of the baby carriage, the lower portion of the push rod 207 lies substantially in parallel to the upper portion of the front leg 202. The upper end of the push rod 207 is provided with a handle 216 to be gripped by a person who pushes the baby carriage. The push rod 207 and the seat suspending rod 206 are turnably interconnected by a pin 217.

The front leg connecting member 208 is turnably connected to the pair of front legs 202 and downwardly foldably at its middle, not shown in detail.

Figure 20:
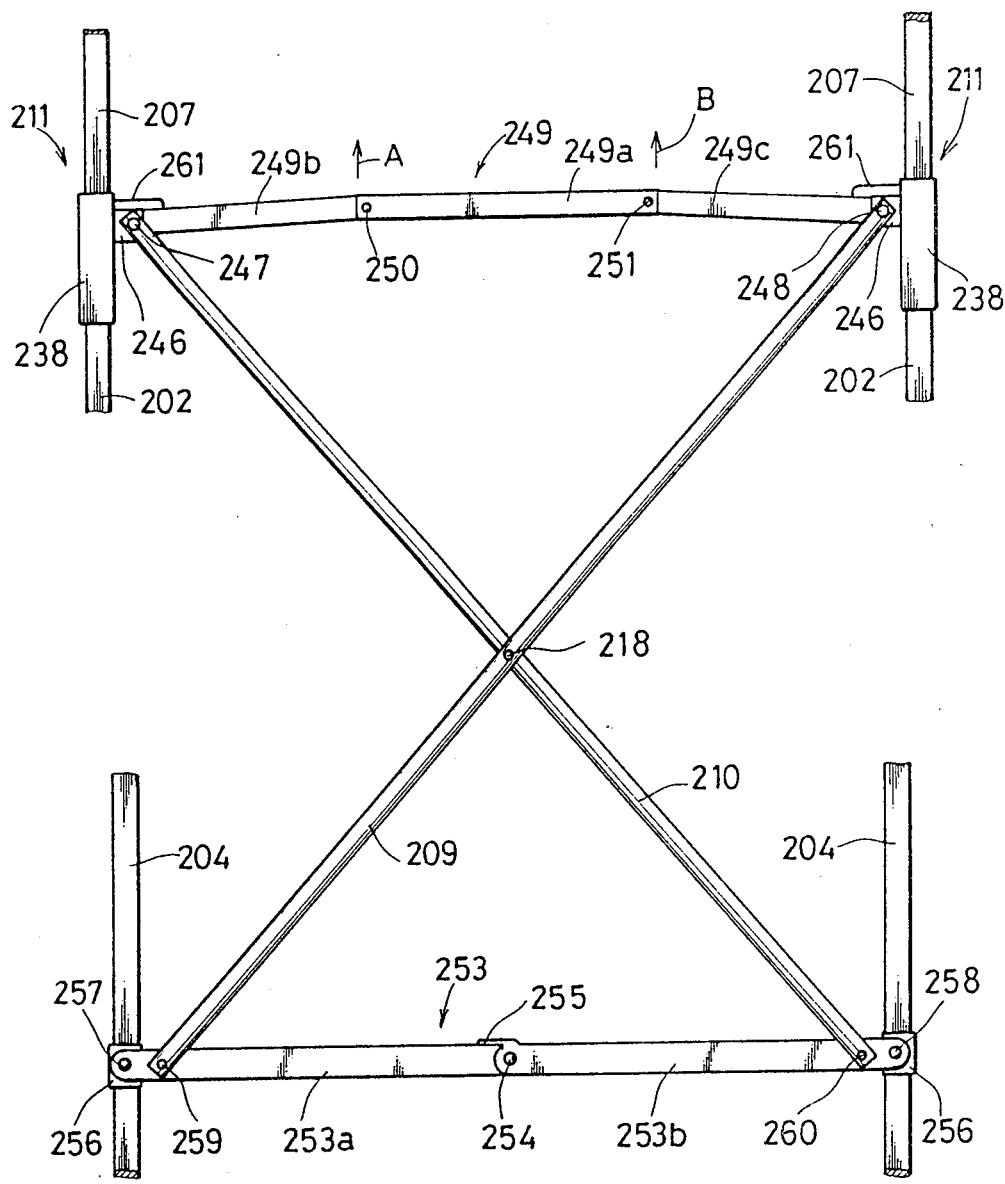
FIG. 20 is a view looking at the construction of parts associated with a pair of cross rods and shown in FIG. 18 from the back of the baby carriage.

FIG. 20 is a view taken from the back of the baby carriage, looking at the pair of cross rods 209 and 210 shown in FIG. 18. The pair of cross rods 209 and 210 cross each other and are turnably connected together at the intersection by a pin 218. The pair of cross rods 209 and 210 connect the pair of push rods 207 and the pair of rear legs 204 in a manner to be described in detail below.

Figure 21:
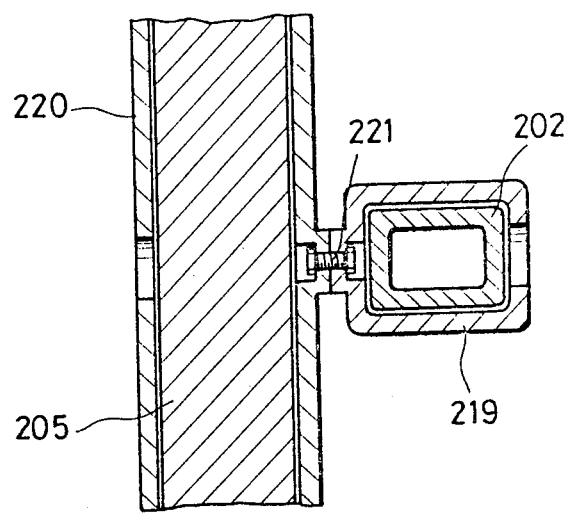
FIG. 21 is an enlarged view of a connecting portion between a front leg sleeve and a seat sleeve 220 shown in FIG. 18.

Referring to FIG. 18, the front leg 202 has a front leg sleeve 219 slidable therealong. The seat support rod 205 has a seat sleeve 220 slidable thereon. The front leg sleeve 219 and the seat sleeve 220 are turnably connected together. FIG. 21 is an enlarged sectional view of a connecting portion between the front leg sleeve 219 and the seat sleeve 220. Referring to FIG. 21, the front leg sleeve 219 slidably receives the front leg 202, while the seat sleeve 220 slidably receives the seat support rod 205. The front leg sleeve 219 and the seat sleeve 220 are turnably connected together by a pin 221.

Though not shown in FIGS. 18 and 19, to esablish an operative connection between the slide movement of the seat sleeve 220 and the folding movement of the front leg connecting member 208, a prop rod is provided between the seat sleeve 220 and the front leg connecting member 208.

FIG. 18 shows the open state of the baby carriage, and to fix this open state, there is provided open state locking means 211 for inhibiting the push rod 207 from turning relative to the front leg 202 and for fixing the cross angle between the pair of cross rods 209 and 210. The details of the open state locking means 211 will be described below.

The seat for supporting a child to be placed in the baby carriage is attached at its seat portion by utilizing the seat support rod 205 and at its backrest portion by utilizing the seat suspending rod 206. In addition, the backrest portion may be attached to the push rod 207.

The open state locking means 211 which should be said to be the essence of the third embodiment of the invention will now be described in detail.

FIGS. 22 and 23 show side views, in section, of the open state locking means 211. The opened state locking means 211 comprises a slide member 222, a spring 223, engaging convex portions 224 and engaging concave portions 225, 226 which engage each other, and an engaging wall 227.

Figure 25:
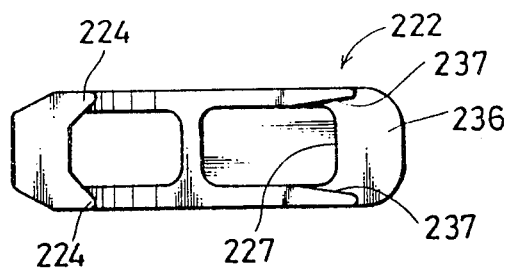
FIG. 25 is a plan view of the slide member.
Figure 24:
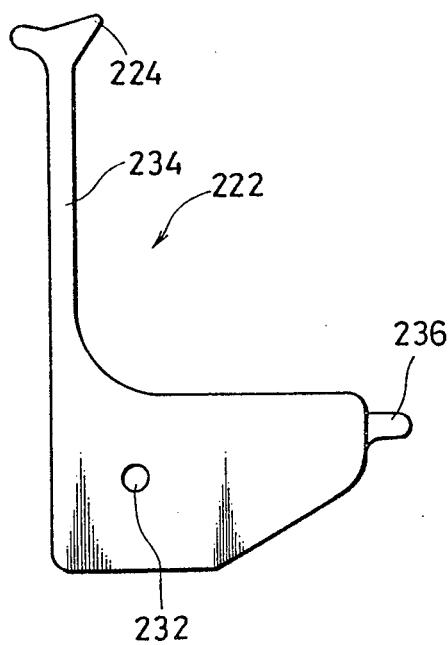
FIG. 24 is a sectional view of the slide member shown in FIGS. 22 and 23.
Figure 26:
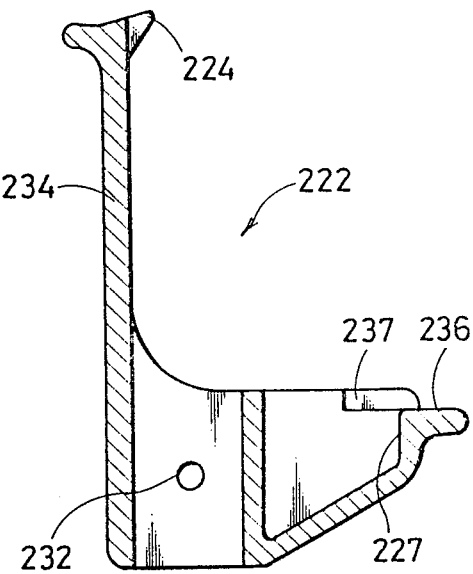
FIG. 26 is a side view, in section, of the slide member.
Figure 31:
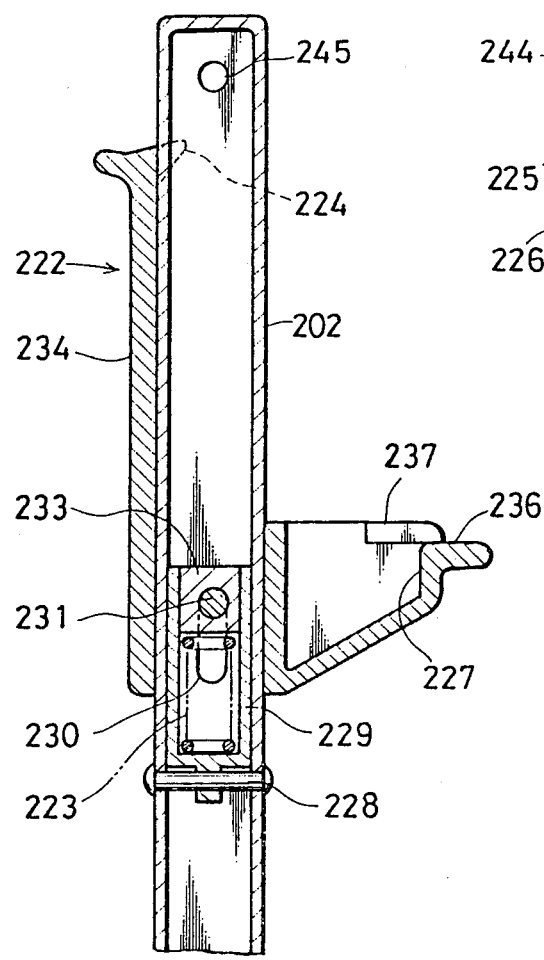
FIG. 31 is a side view, in section, of a connecting portion between the slide member and the front leg.

FIGS. 24 to 26 show the slide member 222 also shown in FIG. 22. FIG. 31 shows a side view, partly in section, of a connecting portion between the slide member 222 and the front leg 202. Referring to these figures, the slide member 222 is slidable on the upper portion of the front leg longitudinally thereof between a first position lying relatively high and a second position lying relatively low. More particularly, inside the upper end of the front leg 202, a spring case 229 is secured thereto by a pin 228. The spring case 229 and front leg 202 have a vertically elongated opening 230. The slide member 222 is fixedly attached to the pin 231. A through-hole 232 shown in FIGS. 24 and 26 receives the pin 231. Thus, the slide member 222 is allowed to slide vertically by the same amount as they by which the pin 231 is movable in the elongated opening 230.

As shown in FIG. 31, inside the front leg 202, a spring support member 233 is fixedly attached. The spring support member 233 is received in the spring case 229. The spring 223 is disposed between the bottom wall of the spring case 229 and the spring support member 233. The spring 223 constantly urges the spring support member 233 to move upwardly. In other words, the spring 223 urges the slide member 222 to return to the first relatively high position.

Referring to FIGS. 24 to 26, the slide member 222 has a columnar portion 234 extending along the front leg 202 extending through said slide member 222, the upper end of said columnar portion 234 being formed with engaging convex portions 224. As best shown in FIG. 22, the slide member 222 has an engaging wall 227 engageable with the lower end of the push rod 207. A guide wall 236 is constructed so that it is continuous with said engaging wall 227. As shown in FIG. 25, the opposed wall which is adapted to receive the lower end of the push rod 207 has a pair of inclined surfaces 237 with a gradually narrowing spacing therebetween. The functions of the engaging wall 227, guide wall 236 and inclined surfaces 237 will be described in more detail below.

Figure 32:
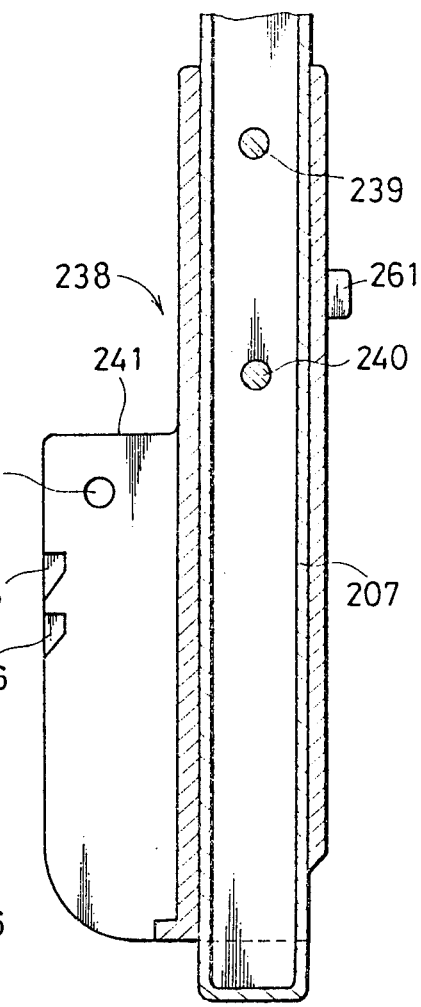
FIG. 32 is a side view, in section, of a connecting portion between the push rod sleeve and the push rod.

Referring to FIGS. 22 and 23, a push rod sleeve 223 surrounding the push rod 207 is secured to the push rod 207 by pins 239 and 240. The push rod sleeve 238 is shown in FIGS. 27 to 30. A side view, partly in section, showing the connecting portion between the push rod sleeve 238 and the push rod 207 is shown in FIG. 32. Referring to these figures, the push rod sleeve 238 has a pair of projecting walls 241, which are turnably connected to the upper end of the push rod 202 by a connecting shaft 215 shown in FIGS. 22 and 23. That is, the push rod 207 is turnable around the axis of the connecting shaft 215. Through-holes 242 and 243 shown in FIG. 27 receive the pins 133 and 134. The connecting shaft 215 extends through a through-hole 244 shown in FIG. 27 and a through-hole 245 shown in FIG. 31.

When the baby carriage is in the open state, the front end surfaces of the projecting walls 241 of the push rod sleeve 238 are in opposed relationship to the columnar portion 234 of the slide member 222. The front end surfaces of the projecting walls 241 are formed with engaging concave portions 225 and 226 engageable with the engaging convex portions 224 of the slide member 222.

When the slide member 222 is in the first position lying relatively high, as shown in FIG. 22, the engaging convex portions 224 of the slide member 222 engage the engaging concave portions 225 taking up the high position. On the other hand, when the slide member 222 is in the second relatively low position a shown in FIG. 23, the engaging convex portions 224 engage the engaging concave portions 226 in their low position.

The related operations of the front leg 202 and push rod 207 will now be described with reference to FIGS. 22 and 23.

When the baby carriage is in the opened state, the upper end of the front leg 202 lies substantially parallel with the lower end of the push rod 207. When the slide member 222 is in the first position shown in FIG. 22, the engaging wall 227 engages the lower end of the push rod 207, thereby inhibiting the turning of said push rod 207. This locked state is firmly maintained by the action of the spring 223. Further, the fitting between the engaging convex portions 224 and the engaging concave portions 225 also effectively acts to firmly maintain the locked state established by the engaging wall 227.

When it is desired to fold the baby carriage, the slide member 222 is caused to slide to the second position shown in FIG. 23. In response to the movement of the slide member 222, the columnar portion 234 outwardly flexes once and then the engaging convex portions 224 engage the engaging concave portions 226. While the spring 223 is acting to move the slide member 222 upwardly, the fitting between the engaging convex and concave portions 224 and 226 prevents such movement. When the slide member 222 is in the second position, the engagement between the engaging wall 227 and the lower end of the push rod 207 is canceled. Therefore, if the push rod 207 is pushed forward, the push rod sleeve 238 and the push rod 207 are turned counterclockwise in FIG. 8. As a result, the fitting between the engaging convex portions 224 of the slide member 222 and the engaging concave portions 226 of the push rod sleeve 238 is canceled, so that the slide member 222 is returned to the first position shown in FIG. 22 by the action of the spring 223.

The operation of changing the baby carriage from the folded to the open state will now be described. When the push rod 207 is turned to realize the open state of the baby carriage, first the lower end of the push rod 207 abuts against the guide wall 236 of the slide member 222. When the push rod 207 is further turned clockwise from this state, the guide wall 236 is pushed downwardly by the lower end of the push rod 207, whereby the slide member 222 slides downwardly. When the lower end of the push rod 207 lies substantially in parallel to the upper end of the front leg 202, the slide member 222 is caused to slide upwardly by the action of the spring 223, until the state shown in FIG. 22 is obtained. Thus, the presence of the guide wall 236 makes it unnecessary to perform a special operation to set the locking means 211 in the locking state. However, it is not absolutely necessary to provide the guide wall 236. In that case, immediately before the upper end of the front leg 202 lies substantially in parallel to the lower end of the push rod 207, the slide member 222 must be manually operated for a downward slide movement.

Figure 33:
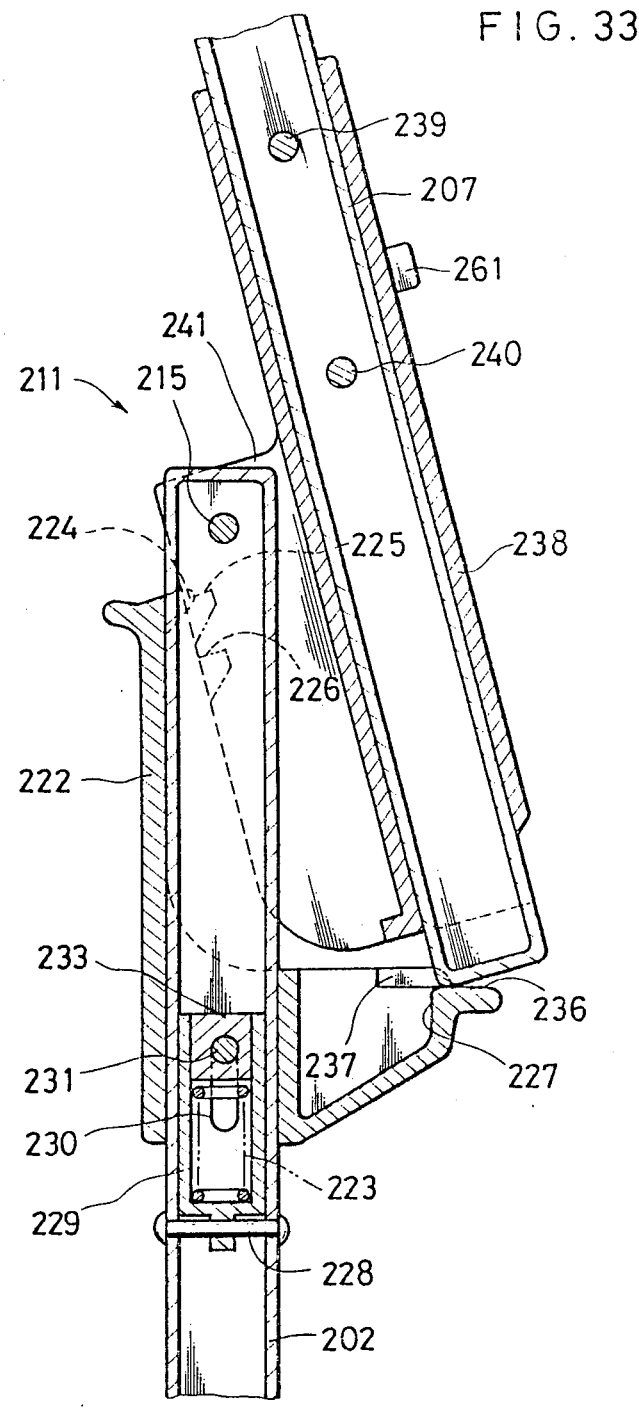
FIG. 33 is a side view, in section, showing the construction of a connecting portion between the front leg and the push rod, the lower end of said push rod abutting against the guide wall of the slide member.

In addition, inclined surfaces 237 formed on the slide member 222 serve to smoothly guide the push rod 207 when the latter is turned clockwise in FIG. 33.

Figure 34:
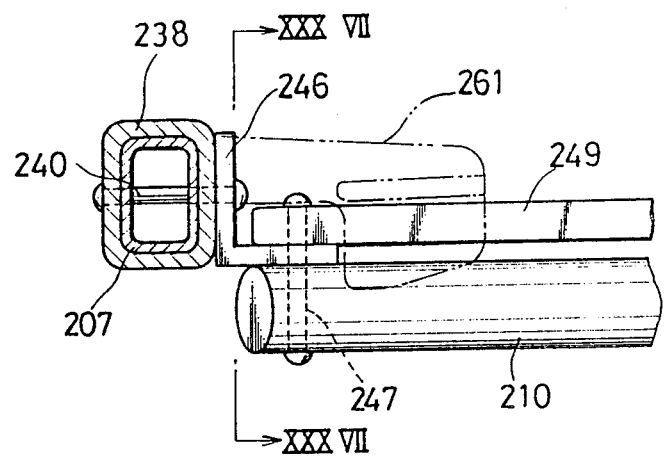
FIG. 34 is a top view, showing the construction of a connecting portion between the push rod and the cross rod.
Figure 35:
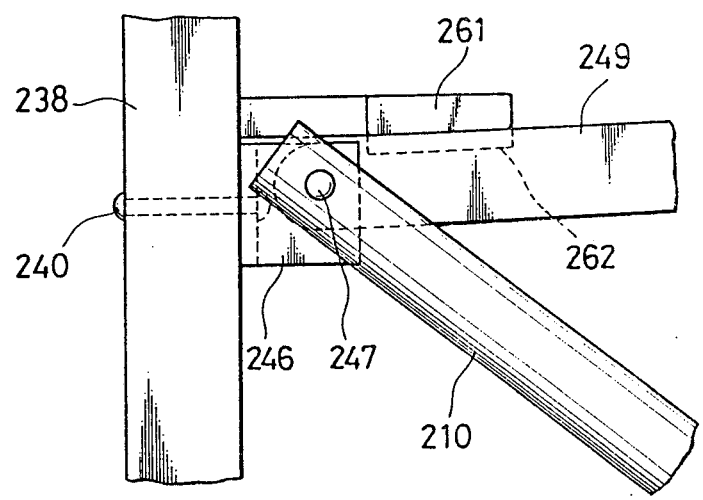
FIG. 35 is a rear view looking at the construction shown in FIG. 34 from the back of the baby carraige.

FIG. 34 is a view looking from above at the construction of the connecting portion between the pair of push rods 207 and the pair of cross rods 209 and 210. In this figure, irrelevant parts are omitted. FIG. 35 is a view looking from behind at the portions shown in FIG. 34.

Referring to FIG. 20 and to FIGS. 34 and 35, the inner lateral surfaces of the pair of push rod sleeves 238 positioned right and left each have an L-shaped connecting member 246 attached therto by a pin 240. Each connecting member 246 is rotatable in a transverse vertical plane. One cross rod 209 is turnably connected at its upper end to the connecting member 246 positioned on the right-hand side surface of the baby carriage by a pin 248. The other cross rod 210 is turnably connected at its upper end to the connecting member 246 positioned on the left-hand side surface of the baby carriage by a pin 247. A widthwise connecting member 249 extending from side to side of the baby carriage, is connected between the pair of connecting members 246 by the pins 247 and 248. As is clear from FIG. 20, the widthwise connecting rod 249 has three members: a central member 249a, a left-hand member 249b and a right-hand member 249c. The left-hand member 249b is turnably connected at its left-hand end to the connecting member 246 by a pin 247 and at its right-hand end to the central member 249a by a pin 250. The right-hand member 249c is turnably connected at its right-hand end to the connecting member 246 by the pin 248 and at its left-hand end to the central member 249a by a pin 251. In other words, the widthwise connecting member 249 is upwardly foldable at its middle portion as shown by arrow A and B in FIG. 20.

Figure 36:
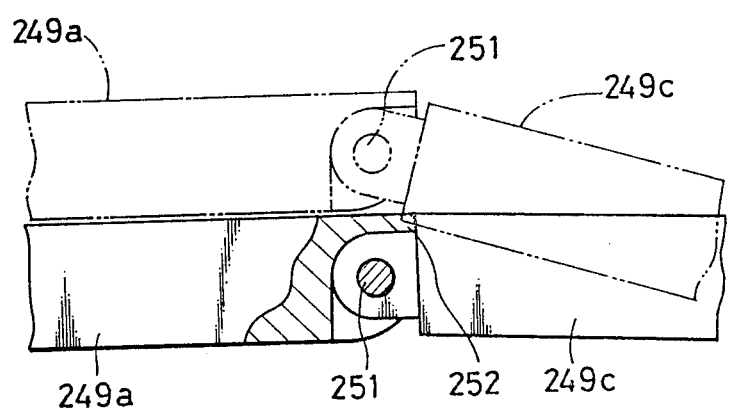
FIG. 36 is an enlarged view of a connecting portion between the central member and right-hand side member of a transverse connecting member shown in FIG. 20.

FIG. 36 is an enlarged view of the connecting portion between the central member 249a and right-hand member 249c of the widthwise connecting rod 249. As shown, the central member 249a has an abutment wall 252 adapted to abut against the upper surface of the right-hand member 249c to prevent its downward folding. When the baby carriage is in the open state, said abutment wall 252 abuts against the upper surface of the right-hand member 249c. A similar construction is also employed between the left-hand member 249b and the central member 249a. In FIG. 36, the slightly upwardly folded respective positions of the central member 249a and right-hand member 249c are shown in phantom lines.

Referring to FIGS. 18 and 20, the pair of rear legs 204 each have an attaching element 256 turnably connected thereto by a pin 263. A rear leg connecting member 253 is connected between the pair of attaching elements 256 by pins 257 and 258. As shown in FIGS. 20, the rear leg connecting member 253 has a left-hand link rod 253a and a right-hand link rod 253b. The left-hand link rod 253a is turnably connected to the attaching element 256 positioned on the left-hand side surface of the baby carriage by the pin 257. The righ-hand link rod 253b is turnably connected to the attaching element 256 positioned on the right-hand side surface of the baby carriage by the pin 258. The left-hand and right-hand link rods 253a and 253b are turnably connected together by the pin 254. The right-hand link rod 253b has an abutment wall 255 adapted to abut the upper surface of the left-hand link rod 253a, said abutment wall 255 serving to prevent the downward folding of the connecting member 253. However, the rear leg connecting member 253 is allowed to fold upwardly from the state shown in FIG. 20.

As shown in FIG. 20, the lower end of one cross rod 209 is turnably connected to the left-hand link rod 253a by a pin 259, while the other cross rod 210 is turnably connected to the right-hand link rod 253b by a pin 260.

Referring to FIGS. 28 and 29 and to FIGS. 34 and 35, the inner surface of the push rod sleeve 238 is has an inwardly extending holder wall 261. The shape of the holder wall 261 will be become clear by reference to FIGS. 28 to 30. FIG. 30 is a sectional view taken along the line XXX—XXX in FIG. 29. As shown in FIG. 30, the holder wall 261 has a depending portion 262 projecting downwardly therefrom.

FIG. 37 is a view taken along the line XXXVII—XXXVII in FIG. 34. Referring to FIG. 37 and to FIGS. 34 and 35, when the baby carriage is in the open state, that is, when the turning of the push rod 207 is inhibited by the engaging wall 227 of the slide member 222, the holder wall 261 abuts against the upper surface of the widthwise connecting rod 249 to inhibit the folding of the widthwise connecting rod 249. Referring to FIG. 20, inhibiting the folding of the widthwise connecting rod 249 fixes the cross angle of the pair of cross rods 209 and 210. Further, as will become clear by reference to Fig. 18, fixing the cross angle of the pair of cross rods 209 and 210 locks the cross angle of the front and rear legs 202 and 204. In this manner, the open state of the baby carriage is maintained stable simply by engaging the slide member 222 installed on the front leg 202 with the lower end of the push rod 207.

When it is desired to unfold the baby carriage, this can be attained by sliding the slide members 222 to the second position shown in FIG. 23. When the push rods 207 are turned forward, the holder walls 261 are moved away from the upper surface of the widthwise connecting rod 249, as shown in FIG. 38. Therefore, the upward folding of the widthwise connecting rod 249 is allowed and hence the turning of the pair of cross rods 209 and 210 is also allowed. In this manner, by turning the push rods 207, the baby carriage is folded longitudinally and transversely, until the state shown in FIG. 19 is obtained.

The illustrated embodiment is an example of the invention only. Thus, it can be modified in various manners within the scope of the invention. For example, it is not absolutely necessary to provide the rear leg connecting member 253 in FIG. 20. In that case, the pair of cross rods 209 and 210 would be turnably connected to the pair of rear legs 204, for example, through spherical bearings. However, the provision of the rear leg connecting member 253 strengthens the construction of the baby carriage in the open state.

In the last embodiment described above, the pair of slide members 222, pair of springs 223, mutually engageable concave and convex portions 224 and 226, and pair of engaging walls 227 have been used as the push rod locking mechanism for inhibiting the push rods 207 from turning relative to the front legs 202. However, a different push rod locking mechanism may be used. For example, the turning of the push rod may be inhibited by using a hook and an engaging pin as in the first embodiment of the invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage comprising a pair of front legs having front wheels on the lower portions thereof, a pair of rear legs having rear wheels on the lower portions thereof and turnably connected to said front legs by first pins at the intersections therebetween, a pair of seat support rods turnably connected at their front portions to the upper portions of said rear legs, a pair of push rods turnably connected at their lower portions to the upper portions of said front legs by second pins at the intersections therebetween, a pair of seat suspending rods turnably connected at their lower portions thereof to the rear portions of said seat support rods by third pins, said seat suspending rods being connected near their upper ends to the respective push rod by fourth pins, widthwise connecting means for interconnecting right and left sides of the baby carriage formed by said front legs, said rear legs, said seat support rods, said seat suspending rods and by said push rods, locking means arranged for fixing said baby carriage in an open state, said front legs, said rear legs, said seat support rods, said seat suspending rods, said push rods, and said widthwise connecting means having such lengths and positions that folding the baby carriage moves said rear wheels toward said front wheels and so that in the folded state, said rear wheels and said front wheels are positioned on substantially the same level, whereby the baby carriage can stand by itself, and wherein said front legs have front leg sleeves slidable thereon, said seat support rods having seat sleeves slidable thereon, and further pins journalling said front leg sleeves and said seat sleeves to each other at their intersections.

2. The baby carriage of claim 1, wherein said widthwise connecting means comprises a front leg connecting member connected between said pair of front legs and foldable at its middle, and a pair of cross rods crossing each other and turnably connected together at their intersection, said cross rods being turnably connected at their upper ends to said pair of push rods and at their lower ends to said pair of rear legs.

3. The baby carriage of claim 2, further comprising prop rods arranged between said seat sleeves and said front leg connecting member for permitting a sliding movement of said seat sleeves and a folding movement of said front leg connecting member.

4. The baby carriage of claim 2, wherein said open state locking means includes means for inhibiting said push rods from turning relative to said front legs.

5. The baby carriage claim 2, wherein said open state locking means includes means for fixing the cross angle of said pair of cross rods.

6. A baby carriage comprising a pair of front legs having front wheels on the lower portions thereof, a pair of rear legs having rear wheels on the lower portions thereof and turnably connected to said front legs by first pins at the intersections therebetween, a pair of seat support rods turnably connected at their front portions to the upper portions of said rear legs, a pair of push rods turnably connected at their lower portions to the upper portions of said front legs by second pins at the intersections therebetween, a pair of seat suspending rods turnably connected at their lower portions thereof to the rear portions of said seat support rods by third pins, said seat suspending rods being connected near their upper ends to the respective push rod by fourth pins, widthwise connecting means for interconnecting right and left sides of the baby carriage formed by said front legs, said rear legs, said seat support rods, said seat suspending rods, and by said push rods, locking means arranged for fixing said baby carriage in an open state, said front legs, said rear legs, said seat support rods, said seat suspending rods, said push rods, and said widthwise connecting means having such lengths and positions that folding the baby carriage moves said rear wheels toward said front wheels and so that in the folded state, said rear wheels and said front wheels are positioned on substantially the same level, whereby the baby carriage can stand by itself, and wherein said open state locking means lock the respective push rod against turning relative to the respective front leg with the upper end of said front leg lying substantially parallel with the lower end of said push rod, said open state locking means further comprising a slide member slidable on said respective front leg lengthwise thereof between a first position lying relatively high and a second position lying relatively low, a spring urging said slide member to return to said first relatively high position, convace and convex portions formed on an opposite portion of said slide member and said push rod, said concave and convex portions fitting together to inhibit the movement of said slide member when said slide member is at least in said second relatively low position, and an engaging wall member secured on said slide member for engaging the lower end of said push rod when said slide member is in said first relatively high position and to disengage said push rod for allowing the turning of said push rod when said slide member is in said second relatively low position.

7. The baby carriage of claim 6, wherein said slide member has a guide wall to be urged downwardly when the baby carriage is changed from the folded to the open state, thereby sliding said slide member downwardly.

8. A foldable baby carriage comprising a pair of front legs having front wheels on the lower portions thereof, a pair of rear legs having rear wheels on the lower portions thereof and turnably connected to said front legs by first pins at the intersections therebetween, a pair of seat support rods turnably connected at their front portions to the upper portions of said rear legs, a pair of push rods turnably connected at their lower portions to the upper portions of said front legs by second pins at the intersections therebetween, a pair of seat suspending rods turnably connected at their lower portions thereof to the rear portions of said seat support rods by third pins, said seat suspending rods being connected near their upper ends to the respective push rod by fourth pins, widthwise connecting means for interconnecting right and left sides of the baby carriage formed by said front legs, said rear legs, said seat support rods, said seat suspending rods, and by said push rods, locking means arranged for fixing said baby carriage in an open state, said front legs, said rear legs, said seat support rods, said seat suspending rods, said push rods, and said widthwise connecting means having such lengths and positions that folding the baby carriage moves said rear wheels toward said front wheels and so that in the folded state, said rear wheels and said front wheels are positioned on substantially the same level, whereby the baby carriage can stand by itself, wherein said pair of push rods is constructed so that when said baby carriage is in an open state, the lower portions of said pair of push rods lie substantially parallel with the upper portions of said front legs, said baby carriage further comprising a pair of connecting members attached to said pair of push rods for permitting turning of said push rods in vertical planes, a pair of cross rods crossing each other and turnably connected together at their intersection, said cross rods being turnably connected at their upper ends to said pair of connecting members and at their lower ends to said pair of rear legs, and a widthwise connecting rod foldable upwardly at its middle and turnably connected at its opposite ends to said pair of connecting members, and wherein said open state locking means comprises a push rod locking mechanism for inhibiting said push rod from turning relative to said front leg, and a holder member secured on said push rod and adapted to abut against the upper surface of said widthwise connecting rod to inhibit the folding of said widthwise connecting rod when the turning of said push rod is inhibited by said push rod locking mechanism.

9. The baby carriage of claim 8, wherein said widthwise connecting rod and said pair of cross rods are connected to said pair of connecting members by the same pins.

10. The baby carriage of claim 8, wherein said push rod locking mechanism comprises a pair of slide members each slidable on the upper end of said front leg lengthwise thereof between a first position lying relatively high and a second position lying relatively low, a pair of springs urging said slide members to return to said first relatively high position, concave and convex portions formed on the opposed portions of said slide member and said push rod, said concave and convex portions fitting together to inhibit the movement of said slide member when said slide member is at least in said second position, and a pair of engaging members for engaging the lower end of said push rod to inhibit the turning of said push rod when said slide member is in said first relatively high position and disengaging said push rod to allow the turning of said push rod when said slide member is in said second relatively high position.

11. The baby carriage of claim 8, wherein said slide member comprises a guide wall to be urged downwardly by the lower end of said push rod when the baby carriage is changed from the folded to the open state, thereby guiding said slide member to slide downwardly.

* * * * *